United States Patent [19]

Boudry

[11] Patent Number: 4,975,779
[45] Date of Patent: Dec. 4, 1990

[54] METHOD OF RECORDING AN IMAGE
[75] Inventor: Michael R. Boudry, London, England
[73] Assignee: The Computer Film Company Limited, London, Great Britain
[21] Appl. No.: 96,023
[22] PCT Filed: Dec. 8, 1986
[86] PCT No.: PCT/GB86/00748
 § 371 Date: Aug. 5, 1987
 § 102(e) Date: Aug. 5, 1987
[87] PCT Pub. No.: WO87/03767
 PCT Pub. Date: Jun. 18, 1987
[30] Foreign Application Priority Data
 Dec. 6, 1985 [GB] United Kingdom ............... 8530098
[51] Int. Cl.$^5$ .............................................. H04N 5/84
[52] U.S. Cl. ...................................... 358/244; 355/20
[58] Field of Search ............... 355/20; 358/332, 345, 358/237, 242, 244, 302, 214, 216, 209, 213.13, 213.17, 347; 250/578

[56] References Cited

U.S. PATENT DOCUMENTS

| 4,096,486 | 6/1978 | Pfeifer et al. | 346/107 R |
| 4,482,919 | 11/1984 | Alston et al. | 358/244 |
| 4,543,601 | 9/1985 | Harada et al. | 358/213 |
| 4,649,433 | 3/1987 | Verhoeven | 358/244 |

FOREIGN PATENT DOCUMENTS

| 0065885 | 12/1982 | European Pat. Off. |
| 0083240 | 7/1983 | European Pat. Off. |
| 0120678 | 10/1984 | European Pat. Off. |
| 0127377 | 12/1984 | European Pat. Off. |
| 2155840 | 5/1973 | France |
| 57-14250 | 1/1982 | Japan |
| 57-101470 | 6/1982 | Japan |
| 57-157681 | 9/1982 | Japan |
| 737459 | 9/1955 | United Kingdom |
| 1360501 | 7/1974 | United Kingdom |
| 1478130 | 6/1977 | United Kingdom |
| 2001504 | 1/1979 | United Kingdom |
| 2091517 | 7/1982 | United Kingdom |
| 2108352 | 5/1983 | United Kingdom |
| 2111798 | 7/1983 | United Kingdom |

OTHER PUBLICATIONS

European Patent Application No. 0013161, Brooke et al., Sep. 7, 1980.
Sequin, Interlacing in Charge-Coupled Imaging Devices, Jun. 6, 1973, IEEE, vol. ED-20, No. 6.

Primary Examiner—L. T. Hix
Assistant Examiner—David M. Gray
Attorney, Agent, or Firm—Merchant, Gould, Smith, Edell, Welter & Schmidt

[57] ABSTRACT

First and second image frames are produced using respectively different sets of pixels. The different sets of pixels arise from movement of an image digitiser (13) with respect to an image (10). The image frames are recorded on a film (32) using an output display device (30). The frames are recorded with such relative positions that the film can be displayed so that the frames are viewed with such a superimposition that the position of the pixels in the first and second sets relative to viewed image are substantially the same on the respective positions of those pixels relative to the image to be reproduced. In this way, the resolution of a recorded image can be greater than that of the output device.

15 Claims, 2 Drawing Sheets

METHOD OF RECORDING AN IMAGE

FIELD OF THE INVENTION

This invention relates to image recording, and in particular to recording pixellated images.

BACKGROUND OF THE INVENTION

In order to reduce an image to digital form for manipulation by a computer, or in order for a computer to generate an image for display, it is customary to divide the image into a large number of picture elements (pixels) each of which can be described by a single colour value, or brightness value in monochrome. When the image is displayed, these pixels will be visible unless they can be made sufficiently small to be unresolved by the eye of a viewer, or are otherwise lost as a result of degradation of the image in subsequent optical processing or in the display system.

In the case of an image which is generated by a computer, sharp pixel boundaries are particularly visible when the intended image contains an abrupt edge which does not align with pixel boundaries, causing, in the case of rectangularly arranged pixels, jagged "staircase" artefacts. This effect is commonly referred to as "aliassing".

Even if the pixels are too small to be seen individually, there can be other consequences of the pixellation process. In particular, if the pixels are regularly distributed in space (e.g. as a rectangular grid), they can give rise to sampling anomalies. This problem arises when the image to be reproduced contains fine detail with a spatial frequency which exceeds the Nyquist frequency determined by the spacing of the pixels (i.e. a frequency of one half the reciprocal of the pixel spacing). In this case, as is well known from sampling theory, the spatial frequency components which exceed the Nyquist frequency are manifested at lower spatial frequencies. The visual effect of this form of "aliassing" is the introduction of "bands" and other clearly visible artefacts.

To minimise the above effects, it is clearly desirable to make the pixels as small as possible. However, the computation time required to process or to generate an image is proportional to the number of pixels, which should for this reason be minimised. In current image reproduction systems, a compromise is usually reached.

The term "image reproduction" is used herein to denote not only the reproduction on a display of an existing image, but also the reproduction of an image which is the result of computer manipulations, for example an image input to a computer by data defining coordinates of an image, an image synthesised within a computer, e.g. forms and patterns generated mathematically, or an image resulting from processing pixel data derived from an existing image.

In computer manipulation of moving images, it is current practice to maintain a fixed subdivision of the image area into pixels, which appear in the same place on consecutive frames. The eye therefore perceives the pixel structure in the moving image, because it is reinforced from one frame to the next. Aliassing artefacts are similarly reproduced in the same place on successive images, and are prominently perceived.

It is desirable to provide a system in which the effects of aliassing can be reduced by providing a recorded image with enhanced resolution.

SUMMARY OF THE INVENTION

According to one aspect of the present invention there is provided a method of recording an image, the method comprising:

producing a first image frame using pixel data related to a first set of pixels;

producing a second image frame using pixel data related to a second set of pixels, the sets of pixels being such that all or substantially all the pixels in the first set overlap but do not coincide in the image with the pixels in the second set; and recording the first and second image frames on a recording medium with such relative positions that, the recording medium can be displayed so that the first and second image frames are viewed with such a superimposition that the positions of the pixels in the first and second sets relative to the viewed image are substantially the same as the respective positions of those pixels relative to the image to be reproduced.

The image to be reproduced may be a still image, in which case the image frames may represent the same image or may represent different components of the image. Alternatively, the image may be a moving image, in which case the image frames may represent different images which, when viewed sequentially, give the effect of a moving image.

Clearly, there may be more than two such image frames superimposed to reproduce a still image.

In a preferred embodiment of the invention, an output device, which displays an image formed of a given number of pixels, displays in turn each image frame so produced to be recorded on the recording medium. Between the display of successive image frames on the output device, the relative positions of the film and output device are mechanically adjusted, thereby obviating the need for complex electronic processing of image signals. Further, by this simple mechanical adjustment, the resolution of the recorded image can be improved over the resolution of the output device obtained with that given number of pixels. For example, with two image frames the resolution may be substantially doubled in one linear dimension, and with four image frames it may be substantially doubled in each of two orthogonal linear dimensions.

According to another aspect of the present invention there is provided apparatus for recording an image, the apparatus comprising:

means for producing a first image frame using pixel data related to a first set of pixels;

means for producing a second image frame using pixel data related to a second set of pixels, the sets of pixels being such that all or substantially all the pixels in the first set overlap but do not coincide in the image with the pixels in the second set; and means for recording on a recording medium the first and second image frames with such relative positions that the recording medium can be displayed so that the first and second image frames are viewed with such a superimposition that the positions of the pixels in the first and second sets relative to the viewed image are substantially the same as the respective positions of those pixels relative to the image to be reproduced.

In one embodiment, the sets of pixels are varied from one frame to the next by translating a rectangular grid of pixels in x and y axes by a fraction of a pixel (or a non-integral number of pixels), so that the pixel boundaries fall in different places in each frame and arranging for each frame to be viewed with a corresponding translation. In other embodiments the shape and/or other properties such as size of the pixels may be varied.

According to a further aspect of the present invention there is provided a recording medium on which there has been recorded a plurality of image frames to be viewed, when the medium is displayed, to provide an image, each image frame having been produced using pixel data relating to a set of pixels forming the image to be recorded in that frame, at least two of the image frames having been produced using pixel data related to respectively different sets of pixels and being recorded on the medium with such relative positions that the medium can be displayed so that they are viewed with such a superimposition that all or substantially all the pixels in the respective sets overlap but do not coincide.

The recording medium can be cinematic film on which there has been recorded a plurality of image frames to be viewed sequentially to provide a moving image, adjacent frames having been produced using pixel data related to different sets of pixels and being arranged on the film such that when they are viewed sequentially they are perceived as having such a superimposition that all or substantially all the pixels from adjacent frames overlap but do not coincide.

The recording medium could be photographic film or other recording medium with a "still image", that is in which the at least two image frames represent the same image and have been recorded with one substantially superimposed on the other.

For a plurality of frames in a moving image, the pattern of variation of sets of pixels from frame to frame might be either random or according to a fixed pattern. In each case, a single frame of a moving image may be described by a map of pixel values, together with a sufficient number of additional parameters (two in the case of rectilinear translations) which define the specific pixellation (sets of pixels) applied in the case of that frame.

For a better understanding of the present invention, and to show how the same may be carried into effect, reference will now be made, by way of example, to the accompanying drawings, in which:

DESCRIPTION OF THE PREFERRED EMBODIMENT

Figure 1:
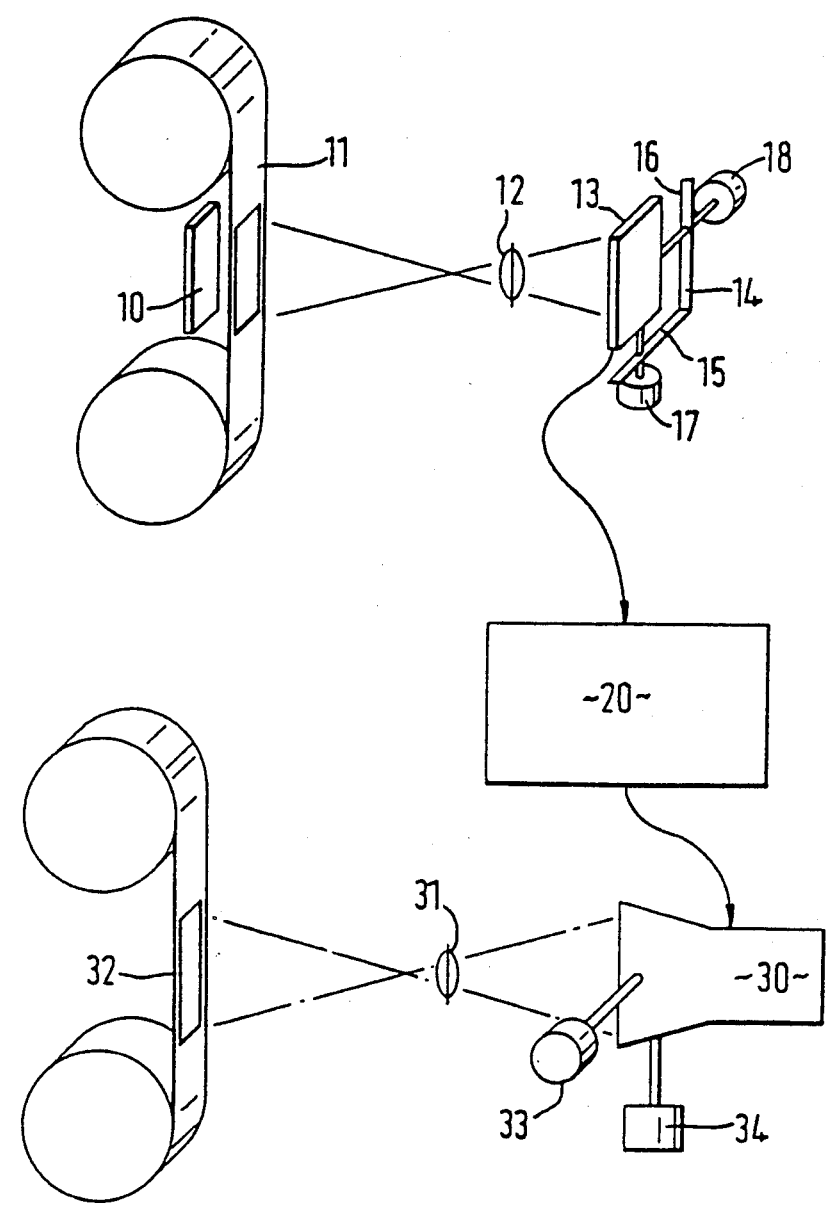
FIG. 1 illustrates diagrammatically an apparatus in accordance with one embodiment of the present invention.

Referring to FIG. 1, light from an illuminator 10 passes through an image recorded on cinematic film 11 which is focussed by lens 12 into the imaging plane of an image digitiser 13. Suitable image digitisers include Charge Coupled Device (CCD) arrays which in one form comprise a two dimensional array of photosensitive elements together with integrated electronic circuits which cause the intensity of light at each photosensitive element to be sequentially measured, converted to digital form, and transmitted to a processor, such as processor 20. Another suitable form of image digitiser comprises a linear CCD array which may be scanned mechanically across the imaging plane in order to produce a digital representation of the image.

Figure 2:
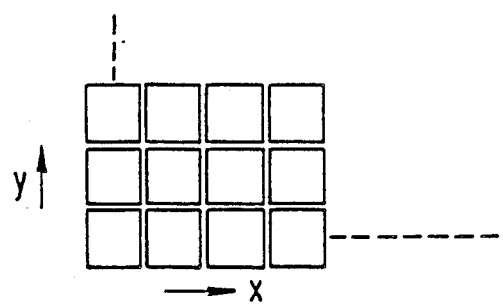
FIG. 2 illustrates diagrammatically a set of pixels used in the apparatus of FIG. 1.

In either case, each digital value produced by these forms of image digitiser can be a measure of the mean density of the original film image over a small rectangular area (one pixel), and the entire image is then represented as an array of values giving the densities of each one of an array of contiguous or nearly contiguous pixels arranged regularly in the x and y directions (orthogonal to each other and to the optical axis) as shown in FIG. 2. Alternatively, an image digitiser could be used in which a pixel value with a weighted mean is formed (e.g. peaked towards the center of the pixel), the pixel being displayed in the reproduced image with a similar weighting. Such weighting is discussed in an article by C. M. Sequin 1EEE Trans. ED-20 pp 535-540. In this case a suitable choice of weighting functions and perhaps some overlap between the responsivity of adjacent pixels can permit the reproduction of uniform areas of the reproduced image without visible pixel structure, and with enhanced reproduction of fine detail in the reproduced image.

The image digitiser 13 is mounted on a translation stage 14 such that small (less than one pixel) accurate displacements can be made in its position in both x and y directions. These displacements are produced by lead screws 15, 16 turned by stepping motors 17, 18 which are controlled by the processor 20.

The digital values representing the image may be stored by the processor, modified by it, or combined with other digitised images, prior to transmission to an output device used to control a Cathode Ray Tube (CRT) 30 by known means whereby the image, represented by a set of pixels, in this case an array of rectangular pixels, is reproduced on a luminescent screen 35.

This image is focussed by lens 31 onto photographic film 32 where the image is re-recorded.

The CRT is provided with translation devices 33, 34 which allow the screen to be moved by small increments in directions corresponding to x and y. These are controlled by the processor in such a way that shifts in the position of the digitiser 13 are exactly compensated by shifts in the position of the CRT, leaving the position of the final image on the output film 32 unaffected by the increments. The positions of the pixels making up the image will, however, change according to the translations of the input device. The effect of this is described in more detail hereinafter.

In operation, the digitiser 13 is held in a first position relative to the image on the film 11 and provides the computer with data related to a first set of pixels forming the image. The processer 20 receives, with this data, data relating to the position of the digitiser 13. The digitiser 13 is then moved by a small amount in both the x and y directions, the amount being less than the size of a pixel by the translation stage 14 to a second position. In the second position it produces data relating to a second set of pixels forming the image, this data being passed to the processor 20 together with data related to the second position of the digitiser. It will be apparent that, by moving the digitiser 13 such a small distance in the x and y directions, the first and second sets of pixels overlap but that the pixels in the second set do not coincide with the pixels in the first set.

Data from the processor 20 is then passed to the CRT 30 to control it in such a way that the first set of pixels are reproduced on the CRT, the image formed thereby being recorded on the film 32. Subsequently, the CRT is moved by an amount corresponding to the translation of the digitiser 13 to a second position. In the second position, the second set of pixels are reproduced on the CRT 30 to form an image on the film 32 which is slightly displaced from the first image so that the relative positions of pixels in the first and second sets in the recorded image are substantially the same as the respective positions of those pixels in the image to be recorded.

The described embodiment of the present invention operates to eliminate some of the effects which normally arise due to pixellation of an image. In the context of moving images, it is well known from conventional cinematography that the perceived sharpness and granularity of the moving image is very much improved with respect to the quality of any individual frame. The eye forgives artefacts in individual frames, and responds to an averaged impression. This effect is utilized herein by reproducing an image using superimposed frames of different pixel sets. For example, with the translations in the x and y directions being of a size corresponding to the size of half a pixel, the so called "staircase" effect arising from a diagonal straight line in a rectangularly pixellated image would be substantially reduced since inter alia the perceived "zig zag" would be of a smaller pitch and less obvious to the eye.

It should be noted that the translation devices need not be placed on the digitiser and CRT respectively, but that equivalent results can be obtained by translating the lenses or the films, or by other optical means.

It is alternatively possible to dispense with the mechanical translation devices on the CRT, and instead move the image electronically with respect to the screen. That is, since the screen of a monochrone CRT is essentially homogenous, the pixels may be displayed in any position on it by applying appropriate analogue signals to the CRT deflection electronics. Choosing mechanical or optical displacements, however, brings additional benefit in that any small imperfections in the screen, or "noise" resulting from granularity of the phosphor coating, are caused to move about with respect to the image, making them less noticeable than would otherwise be the case.

In reproducing a cinematic film by this method, a different pair of displacements in x and y are selected and set up prior to the digitisation of each successive frame. The x and y displacements are chosen either at random or according to a fixed pattern within a range at least as large as a pixel, such that there is no apparent tendency on average for the pixel boundaries to fall in any preferred positions with respect to the image.

If the image is stored by the processor, the chosen displacement values are stored along with each image frame, so that they can be set up correctly when the image is output. In the case of moving images, the required frame superimposition is carried out by the retention effect on the retina of the eye.

It is also possible to generate or reproduce improved still images by forming one image by superposition from several image frames each representing components computed to relatively low resolution but with pixellation varying from image frame to image frame. In particular, this arrangement overcomes the problems of "aliassing" in a very satisfactory and simple way. If a number of such components (e.g. subimages or part images) are to be combined to form an image then the subimage frames for each image must be digitised with the same displacement values so that the relevant pixel sets overlap.

The effect of this technique in still imagery is to reduce the number of pixels which form the image frames in any one phase of the computation, therefore minimising the amount of hardware required, and building up the quality of the final image by repetitively using that hardware in successive passes of the same image. This process can continue until the artefacts resulting from the division of the image into pixels are suppressed to a predetermined degree (although there will be a limit of resolution related to the pixel size which it is not possible to exceed).

The apparatus may also be used for the generation of images, which may be output either alone or combined with other images which have been input as described above. In this case, it is necessary that the description of the image to be generated is computed by or input to the computer in a form which does not presuppose any particular subdivision into pixels. A line, for example, must be defined in terms of the absolute coordinates of the end points. The representation in terms of pixel values can thus vary according to the translation increments chosen for each individual frame, and the superposition of various representations (either temporarily in cinematic, or by multiple exposure in the case of a still image) can have the effect of "anti-aliassing", i.e. suppressing the various artefacts referred to previously.

The above description has referred to the reproduction of a monochrome image Colour images can readily be reproduced, for example by making three passes of each image with colour separation filters interposed in both digitising and output optical systems, as is well known in the art.

It will be appreciated that to achieve the desired effect, the pixel variation may be carried out in several ways. For example, each pixel may be notionally subdivided along the x and y axes into four subdivisions to allow sixteen possible pixellations. The sixteen possibilities may be chosen in a sequence for respective successive frames in a moving image according to a suitable pattern which would (a) give equal weight, on average, to each possibility, and (b) not repeat on a time scale so short as to make apparent to a viewer a distracting temporal pattern. Of course, more or less subdivisions are possible, and a shorter repeat time may be suitable in some circumstances.

Such notional pixel subdivision is also possible for still images, with the frame superimposition occurring on the recording medium or display rather than in the eye of a viewer as with moving images.

For moving images, each image in a moving sequence could be reproduced by superimposition of two or more image frames as described above for still images. The moving image could be further improved if necessary by changing the pixellation for successive frames of the moving image.

The first and second sets of pixels should overlap in that they should cover substantially the same image area of the "images" to be reproduced: these "images" may be the same image, different image components of a still image, or different images to give the effect of a moving image as described earlier. However, the pixels in the first set should not coincide with those in the second set. This is achieved by having pixels in the first and second sets overlapping but not coinciding.

While the described embodiment refers to movement of the image frames by a fraction of a pixel, it will be apparent that a movement of more than one pixel could be used provided that the whole movement is not an integral number of pixels. This may be particularly appropriate to suppress phospher screen defects on a CRT.

As a possible alternative to the rectangular pixels described above, pixels of any shape could be used, with the pixel shape or size altering between image frames.

I claim:

1. A method of recording an image, the method comprising:
   producing a first image frame using pixel data related to a first set of pixels; and
   producing a second image frame using different pixel data related to a second set of pixels, the sets of pixels being such that all or substantially all the pixels in the first set have substantial overlap but do not coincide in the image with the pixels in the second set; and
   recording the first and second image frames on a recording medium with such relative positions that the medium can be displayed so that the first and second image frames are viewed with such an offset superimposition that, over a major portion of the viewed image frames, the positions of the pixels in the first and second sets relative to the viewed image are substantially the same as the respective positions of those pixels relative to the image to be reproduced, to produce a reduced aliassing compared with that existing in either of said image frames alone.

2. A method as claimed in claim 1, in which the image to be recorded is sensed by image sensing means, the first frame being produced with the image sensing means in a first position relative to the image, and the second frame being produced with the image sensing means in a second position relative to the image, the first and second frames being recorded on the medium so that they are viewed at positions corresponding to the first and second positions respectively.

3. A method as claimed in claim 1, in which the image to be recorded is input to a processing means in the form of data defining:
   the set of pixels for each frame; and
   the pixel values for pixels in each frame.

4. A method of recording an image having a boundary, the method comprising the steps of:
   arranging an image sensor in a first position relative to the boundary of the image to produce a first image frame using pixel data related to a first set of pixels;
   providing relative movement between the image sensor and the image in two mutually orthogonal directions relative to the boundary of the image to a second position to produce a second image frame using different pixel data related to a second set of pixels;
   wherein the sets of pixels are such that all or substantially all the pixels in the first set overlap but do not coincide with the pixels in the second set, whereby substantially the whole of the image in the boundary is reproduced in both the first and second sets of pixels;
   recording the first and second image frames on a recording medium in respective first and second positions which correspond to the first and second positions of the image sensor so that the first and second image frames are superimposed with such offset that, over a major portion of the viewed image frames, the positions of the pixels in the first and second sets relative to the viewed image are substantially the same as the respective positions of those pixels relative to the image to be reproduced, said offset being such as to produce a reduced aliassing compared with that existing in each of said image frames alone.

5. A method of producing a cinematic film comprising the steps of:
   using an image sensor to view a first image in a boundary and to produce a frame of the first image using pixel data relating to a first set of pixels;
   providing a second image in the boundary, which second image is to be recorded adjacent the first image on the cinematic film to be viewed successively; providing relative movement of the image sensor to the boundary in two mutually orthogonal directions to produce a frame of the second image using pixel data relating to a second set of pixels wherein the sets of pixels are such that all or substantially all the pixels in the first set overlap but do not coincide in the image with the pixels in the second set; whereby substantially the whole of the image in the boundary is reproduced in both the first and second sets of pixels;
   recording the frames of the first and second images adjacent one another on cinematic film so that when they are viewed successively at a suitable rate the image of one frame is retained on the retina of a viewer's eye while the other frame is being viewed, so that the positions of the pixels in the first and second sets relative to the viewed image are substantially the same as the respective positions of those pixels relative to the image to be reproduced.

6. Apparatus for recording an image to be reproduced, the apparatus comprising:
   an image sensing device having an array of photosensitive elements for producing in a first position relative to the image to be reproduced a first image frame using pixel data related to a first set of pixels;
   means for providing relative movement between the image sensing device and the image in two mutually orthogonal directions to a second position to produce a second image frame using different pixel data related to a second set of pixels, the sets of pixels being such that, over a major portion of the image frames, all or substantially all the pixels in the first set overlap but do not coincide in the image with the pixels in the second set; and
   means for recording on a recording medium the first and second image frames with such relative positions that the first and second image frames can be viewed with such an offset superimposition that the positions of the pixels in the first and second sets relative to the viewed first and second image frames are substantially the same as the respective positions of those pixels relative to said image to be reproduced to produce a reduced aliassing compared with that existing in either of said image frames alone.

7. Apparatus as claimed in claim 6 in which the recording means comprises means for displaying the first image frame at a first position on the recording medium and means for moving the displaying means relative to the recording medium to record the second image frame at a second position on the recording medium, the said first and second positions corresponding to the first and second position of the image sensing device.

8. A method as claimed in claim 1, wherein the image frames are produced such that, in each set of pixels, substantially all of the pixels each overlap four pixels in another set.

9. A method as claimed in claim 1, wherein the image frames are produced such that, over a major portion of the frames, the regions where pixels neighbour one another in the image frame of one set are substantially completely covered by the pixels of the other set in the viewed image.

10. A method as claimed in claim 1 wherein the image frames are produced such that, in each set, the pixels are arranged in row and column format and the rows and columns of one set overlap the rows and columns of the other set.

11. A method as claimed in claim 1, wherein the image frames are produced such that each image frame has a substantially rectangular boundary and said offset is in a direction having components parallel to two adjacent sides of said boundary.

12. A method as claimed in claim 1, wherein the image frames are produced such that a viewed image is made up of more than two image frames and the offsets from one frame to the next are in respective directions which are not all the same.

13. A method as claimed in claim 4, wherein the image frames are produced such that, over a major portion of the frames, the regions where pixels neighbour one another in the image frame of one set are substantially completely covered by the pixels of the other set in the viewed image.

14. A method as claimed in claim 5, wherein the image frames are produced such that, over a major portion of the frames, the regions where pixels neighbour one another in the image frame of one set are substantially completely covered by the pixels of the other set in the viewed image.

15. Apparatus as claimed in claim 6, wherein the image frames have been recorded such that, over a major portion of the image frames, the regions where pixels neighbour one another in the image frame of one set are substantially completely covered by the pixels of another set.

* * * * *